(12) United States Patent
Rapp (10) Patent No.: US 10,142,026 B2
(45) Date of Patent: Nov. 27, 2018

(54) RAMAN PUMPING ARRANGEMENT WITH IMPROVED OSC SENSITIVITY

(71) Applicant: Xieon Networks S.à.r.l., Senningerberg (LU)

(72) Inventor: Lutz Rapp, Deisenhofen (DE)

(73) Assignee: Xieon Networks S.a.r.l., Senningerberg (LU)

( * ) Notice: Subject to any disclaimer, the term of this patent is extended or adjusted under 35 U.S.C. 154(b) by 0 days.

(21) Appl. No.: 15/661,756

(22) Filed: Jul. 27, 2017

(65) Prior Publication Data

US 2018/0083413 A1 Mar. 22, 2018

(30) Foreign Application Priority Data

Sep. 22, 2016 (EP) .................................... 16190230

(51) Int. Cl.
| | | |
|---|---|---|
| *H04B 10/00* | (2013.01) | |
| *H04B 10/291* | (2013.01) | |
| *H04B 10/077* | (2013.01) | |
| *H01S 3/067* | (2006.01) | |
| *H01S 3/094* | (2006.01) | |
| *H01S 3/10* | (2006.01) | |
| *H01S 3/30* | (2006.01) | |

(52) U.S. Cl.
CPC ..... *H04B 10/2916* (2013.01); *H01S 3/06716* (2013.01); *H01S 3/06754* (2013.01); *H01S 3/094003* (2013.01); *H01S 3/10007* (2013.01); *H01S 3/30* (2013.01); *H01S 3/302* (2013.01); *H04B 10/077* (2013.01); *H04B 10/0777* (2013.01)

(58) Field of Classification Search
CPC .. H04B 10/077; H04B 10/2916; H04B 10/29; H04B 10/293; H04B 2210/08; H04B 2210/078; H01S 3/094003; H01S 3/06716; H01S 3/06754; H01S 3/10007; H01S 3/30; H01S 3/302
See application file for complete search history.

(56) References Cited

U.S. PATENT DOCUMENTS

| | | |
|---|---|---|
| 8,228,598 B2 | 7/2012 | Chang et al. |
| 2002/0041431 A1* | 4/2002 | Ohshima ................. H01S 3/302 359/334 |
| 2002/0114060 A1 | 8/2002 | Kobayashi et al. |

(Continued)

*Primary Examiner* — Armando Rodriguez
(74) *Attorney, Agent, or Firm* — Nelson Mullins Riley & Scarborough LLP (57) ABSTRACT

A Raman pumping arrangement for amplifying a data optical signal (40) has a Raman pump (12) for generating a Raman pump signal (44;45), an optical supervisory channel receiver (14) for receiving an optical supervisory channel signal (42) an amplification fiber (15) arranged such that the data optical signal (40), the optical supervisory channel signal (42), and the Raman pump signal (44;45) are transmitted therethrough; and a control unit (13) configured for controlling the operation of the Raman pump (12); wherein the control unit (13) is configured for setting the Raman pump (12) in an operation mode or a start-up mode; wherein in the operation mode, the Raman pump (12) provides an operation pumping power (120), and wherein in the start-up mode, the Raman pump (12) provides a start-up pumping power (122).

15 Claims, 9 Drawing Sheets

(56) References Cited

U.S. PATENT DOCUMENTS

2004/0042063 A1\* 3/2004 Ohtani ............... H04B 10/0775
                                                    359/341.3
2006/0140626 A1   6/2006 Robinson et al.
2012/0033293 A1   2/2012 Zaacks et al.

\* cited by examiner

RAMAN PUMPING ARRANGEMENT WITH IMPROVED OSC SENSITIVITY

PRIORITY INFORMATION

This application claims priority to and the benefit of European Patent Application No. 16 190 230.9, filed in the European Patent Office on Sep. 22, 2016, the entire contents of which are incorporated herein by reference.

FIELD OF THE INVENTION

The present invention is in the field of fiber optic communication. In particular, the present invention relates to a Raman pumping arrangement for amplifying a data optical signal transmitted in a fiber optic transmission system and to a corresponding method of amplifying a data optical signal.

BACKGROUND OF THE INVENTION

The use of fiber-optic communication systems for transmitting information by sending light signals through an optical fiber is omnipresent in the telecommunications industry. Optical fibers are used to transmit various kinds of communication signals over long distances via a vast amount of existing interurban and submarine transoceanic fiber communication lines.

In order to ensure the undisturbed detection of the communication signals after propagation over long distances, discrete optical amplifiers are deployed along the optical transmission line in multiple locations to energetically boost the signal being transmitted. These optical amplifiers are at amplification locations which can be spaced hundreds of kilometers apart, typically between 50 km and 120 km, and may be placed on remote locations, possibly under the sea.

Distributed optical amplification is a technology allowing to further increase performance that consists in exploiting the Raman gain induced by stimulated Raman scattering (SRS) in a given medium. The Raman-active medium is often the optical transmission fiber itself, which enables distributed amplification before the signal reaches the terminal site. In Raman amplification, a lower frequency "signal" photon induces the inelastic scattering of a higher frequency "pump" photon in the Raman-active medium. As a result of this inelastic scattering, another "signal" photon is produced, while the surplus energy is resonantly passed to the vibrational states of the medium. This process hence allows for an all-optical amplification.

In contrast to remote optically pumped amplifiers (ROPAs) that are for example known from US 2012/0033293 A1, distributed Raman amplification can be installed in an existing fiber link without modifying the fiber infrastructure, i.e. without having to access intermediate locations of the fiber. Thus, distributed Raman amplification is a convenient technology for upgrading existing fiber links at reasonable cost, since only the equipment at the terminal sites needs to be modified or replaced.

In ROPA-based systems, a ROPA cassette containing an erbium-doped fiber (EDF) is embedded into the fiber link at a remote location, typically between 80 km and 120 km away from the receiving site. Thus, signals propagating in the transmission fiber are amplified in a dedicated piece of fiber when their power levels are significantly higher than at the receiving site. The pump power is supplied to this remote ROPA cassette from the receiving site via the segment of the transmission fiber connecting the remote location with the receiving site. In this segment, the pump power propagating in opposite direction to a transmitted data optical signal that has already experienced amplification in the ROPA cassette will further amplify the data optical signal due to SRS. But the performance benefit mainly stems from the amplification in the ROPA cassette. Pump power provided to the ROPA cassette is almost completely absorbed in the ROPA cassette such that the pump power provided from the receiving site does not induce any noticeable Raman amplification in the segment of the transmission fiber between the ROPA cassette and the transmit site, at which the data optical signal is emitted.

Typically, fiber optic communication systems comprise an optical supervisory channel (OSC) on which information for monitoring and managing the functioning of the fiber optic communication system is transmitted. For example, the OSC may be employed to send instruction signals to different devices along the fiber optic communication system. Further, the OSC can be used to check fiber continuity and integrity. An interruption in the reception of the OSC may be used to detect a fiber breakage. Such fiber breakages constitute a severe hazard when using technologies employing high pumping powers, as is the case in distributed Raman amplification. When leaking from a broken fiber, the high power light used for Raman amplification poses a potential danger for the skin and eyes of a human operator supervising or manipulating the system or a passer-by. For this reason, laser safety mechanisms have been developed, which ensure that fiber integrity is checked and confirmed before and while high power light is launched into a fiber optic communication system. An OSC signal transmitted on said OSC is commonly used for this purpose.

Once the broken fiber has been repaired, such OSC signal can in principle be used to indicate fiber integrity to the Raman amplification device, such that the amplification, in particular the Raman pumping, can be resumed. However, the transmission of an OSC signal over long distances in a fiber optic communication system requires in long spans the use of optical amplification in the fiber as much as the transmission of any data optical signal does. Consequently, in absence of the Raman amplification, namely when normal operation of the Raman pumps has been interrupted upon detection of a fiber breakage as stipulated by laser safety measures, the OSC signal does not benefit from Raman amplification in the fiber either, and can therefore often not be transmitted over sufficiently long distances to indicate the restored fiber integrity. Accordingly, without ensuring sufficient strength of the transmitted OSC signal even in absence of the Raman amplification, the OSC signal cannot be used for triggering the resumption of the Raman amplification.

Different solutions have been proposed in order to overcome this problem described above. One of them, disclosed in US 2006/0140626 A1, refers to the possibility of arranging conventional optical amplifiers between a wavelength selective coupler separating the OSC from the data optical signal and an OSC receiver to directly amplify the OSC signal before it reaches the OSC receiver. However, this solution adds significant equipment costs and requires additional space for installation of the extra amplifier.

A further alternative not making use of such additional amplifiers relies on the use of an optical switch for directing pumping power designated for Raman amplification in the fiber into an amplifier in which the OSC signal can be amplified. However this has the drawback of leaving less pumping power available for Raman amplification in the fiber during normal operation due to the insertion losses of the switch. Further, optical switches able to withstand the corresponding high power levels are scarce and very costly.

In U.S. Pat. No. 8,228,598 B2, an optical amplification mechanism is disclosed that combines Raman amplification in discrete amplifiers with amplification in an erbium-doped fiber (EDF) by launching residual Raman pump power into an EDF. However, no method is disclosed therein for ensuring correct detection of an OSC signal when normal pumping conditions of the Raman pumps are prohibited for laser safety reasons.

In view of the above, there is a need for technical improvements in the OSC sensitivity of Raman pumping arrangements.

SUMMARY OF THE INVENTION

The problem underlying the invention is to ensure the transmission of an optical supervisory channel (OSC) in a fiber optic communication system making use of distributed Raman amplification even when Raman amplification has been interrupted, for example on laser safety grounds. This problem is solved by a Raman pumping arrangement according to claim 1 and a method according to claim 10. Preferable embodiments of the invention are described in the dependent claims.

The invention relates to a Raman pumping arrangement for amplifying a data optical signal transmitted in a fiber optic transmission system comprising a Raman pump, an OSC channel receiver, an amplification fiber, and a control unit. The Raman pump is configured for generating a Raman pump signal, wherein the Raman pump signal is used for amplifying the data optical signal in the fiber optic transmission system. The OSC receiver is configured for receiving an OSC signal transmitted through the fiber optic transmission system and copropagating with the data optical signal.

The amplification fiber is arranged such that the data optical signal, the OSC signal, and the Raman pump signal are transmitted therethrough. In particular, the amplification fiber might be arranged within a Raman pumping device, such as a Raman card, comprising all other components of the Raman pumping arrangement of the invention, but it may also be arranged outside of a device comprising said other components. Noticeable Raman amplification of data optical signal and the OSC signal induced by the Raman pump signal takes place in a part of the optical transmission fiber where the Raman pump signal has already passed the amplification fiber. Preferably, the Raman pump signal induces higher Raman gain to the data optical signal and the OSC signal in said part of the optical transmission fiber than in the remaining part, in which the Raman pump signal has not passed the amplification fiber yet.

The control unit is functionally connected to the Raman pump and to the OSC receiver, and is further configured for controlling the operation of the Raman pump. In particular, the control unit is configured for setting the Raman pump in an operation mode, when the OSC receiver receives OSC signal, or in a start-up mode, when the OSC receiver does not receive the OSC signal. In the operation mode, the Raman pump provides an operation pumping power, and in the start-up mode, the Raman pump provides a start-up pumping power, wherein the start-up pumping power is smaller than the operation pumping power, and wherein the start-up pumping power is suitable for pumping the amplification fiber.

The operation pumping power corresponds to the pumping power used during normal operation for distributed Raman amplification of the data optical signal in the fiber optic transmission system. The start-up pumping power corresponds to a significantly smaller pumping power, which is well below the pumping power required for distributed Raman amplification of the data optical signal in the fiber optic transmission system, but enough for amplifying the OSC channel in the amplification fiber such that it can be received at the OSC channel receiver. In particular, the start-up pumping power might be within the limits established by conventional laser safety regulations.

Thus, even in a situation of uncertainty about the integrity of the fiber optic transmission system and hence about the laser safety measures required to prevent skin and eye damage to a human operator or passer-by, the start-up pumping power may be used to pump the amplification fiber such that the OSC channel be amplified therein so that it can be received at the OSC channel receiver in case fiber integrity is provided or has been re-established after a fiber breakage. This way, the OSC channel receiver can detect the OSC channel after normal operation of the Raman pump has been interrupted on laser safety reasons, due for instance to a fiber breakage, once fiber integrity has been re-established. Then, a command might be transmitted through the OSC channel to any devices of the optical transmission system to indicate that normal operation can be resumed, which for example may include resuming normal operation of pumping devices such as boosters and Raman pumps.

In a preferred embodiment of the invention, the operation pumping power is between 500 mW and 4000 mW, and the start-up pumping power is between 50 mW and 130 mW. The operation pumping power is then in a range sufficient to provide Raman gain in the optical transmission system for the data optical signal and the OSC signal, i.e. in the fiber, whereas the start-up pumping power is below the limits established by laser safety regulations and hence typically too low to provide significant Raman gain in the fiber, but is sufficient to provide enough amplification gain in the amplification fiber for the OSC to be detected at the OSC receiver.

According to preferred embodiments of the invention, one or more of the length, doping, and material composition of the amplification fiber is chosen such that an amplification gain for the OSC signal in the amplification fiber allows the OSC receiver to receive the OSC signal when the Raman pump is in the start-up mode. Herein, the OSC receiver is understood to "receive" the OSC signal when the OSC signal arriving at the OSC receiver is sufficiently strong to be detected and/or identified by the OSC receiver. Advantageously, this allows a configuration of the Raman pumping arrangement ensuring that the OSC signal can be detected at the OSC receiver in the start-up mode for example taking into account the fiber distance between amplification locations through which the OSC signal is to be transmitted and the level fiber attenuation.

In a preferred embodiment of the invention, one or more of the length, doping, and material composition of the amplification fiber is chosen such that an amplification gain for the OSC signal in the amplification fiber when the Raman pump is in the start-up mode is at least 5 dB, preferably at least 10 dB.

In a preferred embodiment of the invention, one or more of the length, doping, and material composition of the amplification fiber is chosen such that an attenuation of the Raman pump signal in the amplification fiber when the Raman pump is in the operation mode is smaller than 1 dB, preferably smaller than 0.5 dB, and more preferably smaller than 0.3 dB.

Preferably, said gain for the OSC signal in the amplification fiber applies to a wavelength of the data optical signal between 1525 nm and 1625 nm and/or of the OSC signal between 1350 nm and 1530 nm, preferably between 1490 nm and 1525 nm.

According to preferred embodiments of the invention, the amplification fiber is a rare earth doped fiber, in particular an erbium doped fiber amplifier (EDFA).

In a preferred embodiment of the invention, the amplification fiber has a length between 3 m and 15 m, preferably between 8 m and 12 m.

In a preferred embodiment of the invention, the total peak absorption of the amplification fiber, i.e. the peak absorption coefficient at the wavelength of the data optical signal and the OSC signal multiplied with the length of the amplification fiber, is between 18 dB and 90 dB, preferably between 36 dB and 60 dB.

According to a preferred embodiment of the invention, the control unit is configured for setting the Raman pump in the start-up mode when the OSC receiver does not receive or stops receiving the OSC signal, and setting the Raman pump in the operation mode, once the OSC receiver has started receiving the OSC signal. This way, the process of setting the Raman pump in the start-up mode or in the operation mode according to whether the OSC signal is being received at the OSC receiver or not can be automatized, rendering the supervision of a human operator unnecessary. For instance, in case that a new fiber breakage leads to an interruption of the OSC signal transmission, the control unit may react thereto by automatically setting the Raman pump in the start-up mode, thereby stopping the generation of potentially hazardous Raman pump signal. Likewise, when, after the interruption of normal operation of the Raman pump due e.g. to a fiber breakage, the fiber has been repaired, the OSC signal can be detected at the OSC receiver thanks to it being amplified at the amplification fiber, which causes the control unit to set the Raman pump back in the operation mode, thereby re-establishing Raman pumping of the data optical signal and hence resuming normal operation of the Raman pumping arrangement.

In a preferred embodiment of the invention, the control unit is further configured for setting the Raman pump in an inspection mode when the OSC receiver has not received the OSC signal for more than a predefined waiting time, wherein in the inspection mode, the Raman pump is deactivated and intermittently activated and set in the start-up mode in predefined scanning time intervals for a predefined inspection time. For example, if the predefined waiting time is 10 minutes, the predefined scanning time interval is 2 minutes and the predefined inspection time is 10 seconds, the control unit is configured for setting the Raman pump in the inspection mode when the OSC receiver has not received the OSC signal for more than 10 minutes, and then to intermittently activate and deactivate the Raman pump setting it in the start-up mode every 2 minutes for 10 seconds. Preferably, the predefined waiting time is between 5 minutes and 30 minutes, the predefined inspection time is between 5 seconds and 2 minutes, and the predefined scanning time interval is between 1 minute and 10 minutes. This way, the Raman pumping arrangement can await the re-establishment of fiber integrity allowing for the Raman pump to be set in the operation mode in a way not requiring continuous pumping and hence allowing to save energy and resources.

According to a preferred embodiment of the invention, the Raman pumping arrangement has a first and a second port, wherein the data optical signal and the OSC signal can be transmitted through the Raman pumping arrangement from the first port towards the second port, wherein the Raman pump is arranged to emit the Raman pump signal through the first port. This configuration allows using the Raman pumping arrangement for counterdirectional Raman amplification of the data optical signal and the OSC signal, thereby allowing an improved optical signal-to-noise ratio.

According to a preferred embodiment of the invention, the Raman pumping arrangement has a first and a second port, wherein the data optical signal and the OSC signal can be transmitted through the Raman pumping arrangement from the first port towards the second port, wherein the Raman pump is arranged to emit the Raman pump signal through the second port. This configuration allows using the Raman pumping arrangement for codirectional Raman amplification of the data optical signal and the OSC signal, which allows lowering the impact of non-linear effects in the amplification of the data optical signal and the OSC channel without substantially affecting the optical signal-to-noise ratio. Advantageously, this may allow increasing the launch power of the OSC and hence having longer distances between successive amplification sites in a fiber optic amplification system, without having to face severe nonlinear signal distortion.

In a preferred embodiment of the invention, the Raman pumping arrangement has a first and a second port, wherein the data optical signal and the OSC signal can be transmitted through the Raman pumping arrangement between the first and the second port, wherein the Raman pump is arranged to emit a part of the Raman pump signal through the first port and another part of the Raman pump signal through the second port.

Note that while only embodiments comprising individual Raman pumping arrangements are described in detail in this application, the invention also relates to combinations of one or more of the described embodiments. For instance, a Raman pumping arrangement configured for codirectional Raman amplification of the data optical signal and the OSC signal according to the invention and a Raman pumping arrangement configured for counterdirectional Raman amplification of the data optical signal and the OSC signal according to the invention might be used in combination such that Raman amplification of the data optical signal and the OSC signal takes place both codirectionally and counterdirectionally, that is bidirectionally. These configurations allow using the Raman pumping arrangement for bidirectional Raman amplification of the data optical signal and the OSC signal, which may in particular allow combining counterdirectional and codirectional Raman pumping such that, for instance, a power profile of the data optical signal and/or of the OSC signal can be optimized so as to provide an advantageous balance between optical signal-to-noise improvement and non-linear effects.

In a further embodiment of the invention, the Raman pumping arrangement is configured such that, in the operation mode, the Raman pump signal provides at least 50% of the total Raman amplification gain caused to the data optical signal in a portion of the fiber optic transmission system located after the amplification fiber with respect to the propagation of the Raman pump signal. This configuration might be based on one or more of the length, doping level, and position of the amplification fiber with respect to the Raman pumping arrangement and/or of the characteristics of the Raman pumping light being such that at least 50% of the total Raman amplification gain caused to the data optical signal takes place in said portion of the fiber optic transmission fiber.

According to a preferred embodiment of the invention, the Raman pumping arrangement is configured to support various amplification fibers having different length and/or dopant concentration and to be inserted between the first port of the pumping arrangement and the transmission fiber. The selection of the appropriate amplification fiber may be done according to the power of the OSC signal at the output of the optical transmission fiber and to the available pump power.

A further aspect of the invention relates to a method of amplifying a data optical signal transmitted in a fiber optic transmission system by Raman amplification using a Raman pumping arrangement, the Raman pumping arrangement comprising a Raman pump for generating a Raman pump signal, wherein the Raman pump signal is used for amplifying the data optical signal in the fiber optic transmission system, and an OSC receiver for receiving an OSC signal transmitted through the fiber optic transmission system, wherein the OSC signal copropagates with the data optical signal.

The method comprises a step of determining whether the OSC signal is being received at the OSC receiver and setting the Raman pump in an operation mode if the OSC receiver receives the OSC signal, or setting the Raman pump in a start-up mode, if the OSC receiver does not receive the OSC signal.

In the operation mode, the Raman pump provides an operation pumping power, and in the start-up mode, the Raman pump provides a start-up pumping power, the start-up pumping power being smaller than the operation pumping power, said start-up pumping power being suitable for pumping the amplification fiber.

The method further comprises a step of amplifying the OSC signal in an amplification fiber using the Raman pump signal in the start-up mode for pumping the amplification fiber.

In a preferred embodiment of the invention, the step of setting the Raman pump in the operation mode comprises setting the Raman pump to provide a pumping power between 500 mW and 4000 mW and wherein the step of setting the Raman pump in the start-up mode comprises setting the Raman pump to provide a pumping power between 50 mW and 130 mW.

According to a preferred embodiment of the invention, the method further comprises a step of setting the gain for the pumping power provided by the Raman pump such that an amplification gain of the OSC signal in the amplification fiber when the Raman pump is in the start-up mode is at least 5 dB, preferably at least 10 dB.

In a preferred embodiment of the invention, the method further comprises a step of setting the Raman pump in the start-up mode, when the OSC receiver does not receive or stops receiving the OSC signal, and setting the Raman pump in the operation mode, when the OSC starts receiving the OSC signal.

According to a preferred embodiment of the invention, the method further comprises a step of setting the Raman pump in an inspection mode when the OSC receiver has not received the OSC signal for more than a predefined waiting time, wherein in the inspection mode, the Raman pump is deactivated and intermittently activated and set in the start-up mode in predefined scanning time intervals for a predefined inspection time.

In a preferred embodiment of the invention, the step of amplifying the OSC signal in an amplification fiber comprises amplifying the OSC signal such that, in the operation mode, at least 50% of the total Raman amplification gain provided to the data optical signal is provided in a portion of the fiber optic transmission system located after the amplification fiber (15) with respect to the propagation of the Raman pump signal. This may comprise choosing or adjusting one or more of the length, doping level, and position of the amplification fiber with respect to the Raman pumping arrangement and/or of the characteristics of the Raman pumping light, such that at least 50% of the total Raman amplification gain caused to the data optical signal takes place in said portion of the fiber optic transmission fiber.

DESCRIPTION OF THE PREFERRED EMBODIMENTS

For the purposes of promoting an understanding of the principles of the invention, reference will now be made to a preferred embodiment illustrated in the drawings, and specific language will be used to describe the same. It will nevertheless be understood that no limitation of the scope of the invention is thereby intended, such alterations and further modifications in the illustrated apparatus and such further applications of the principles of the invention as illustrated therein being contemplated as would normally occur now or in the future to one skilled in the art to which the invention relates.

Figure 1:
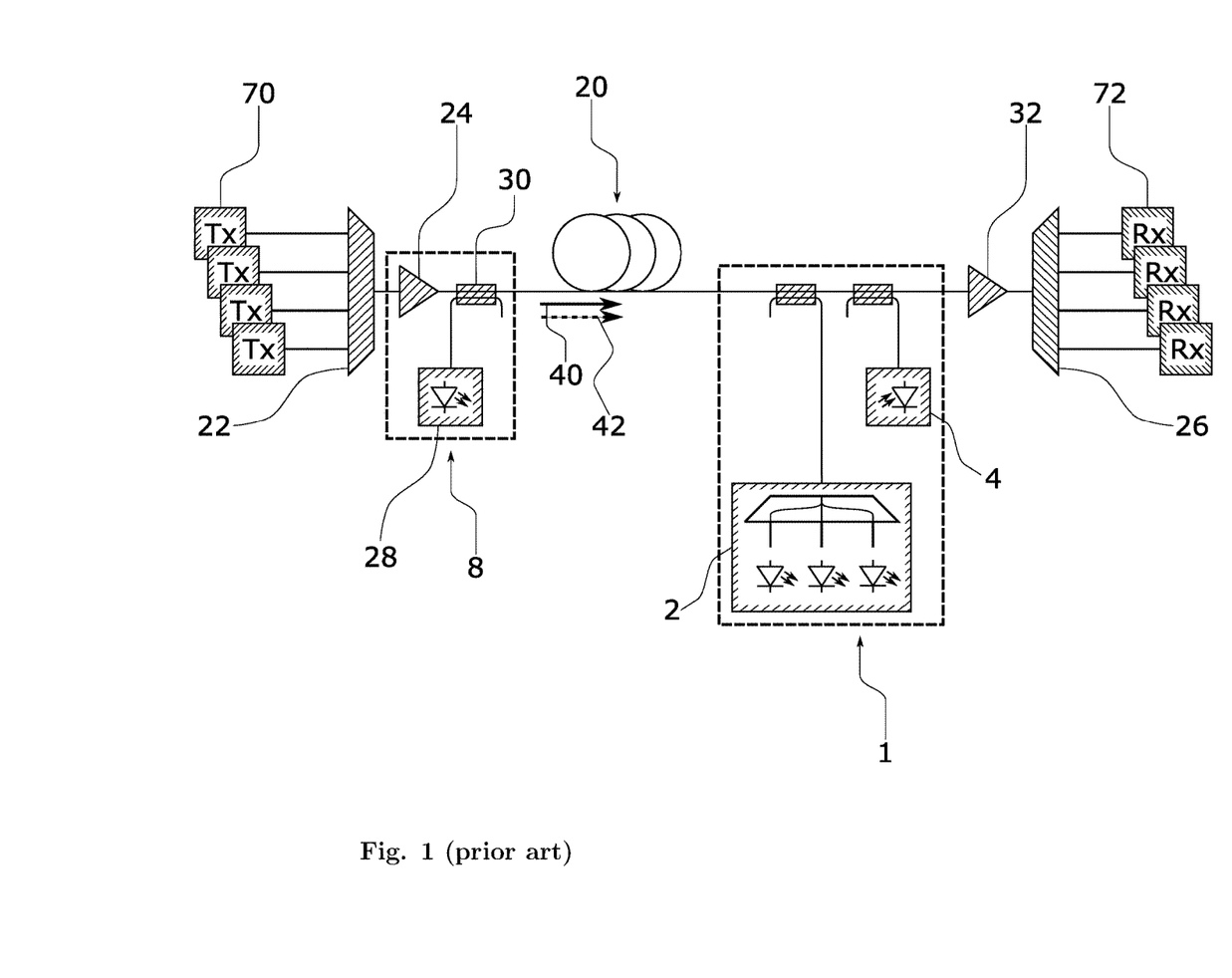
FIG. 1 shows a Raman pumping arrangement according to prior art configurations.

FIG. 1 shows a setup of a single span of a prior art fiber optic communication system for one transmission direction. Several channels of a data optical signal 40 are emitted at transmitters 70, combined by a multiplexer 22, and subsequently amplified by a booster amplifier 24 to be launched into the transmission fiber 20 together with a copropagating OSC signal 42, which is launched by an OSC transmitter 28. The booster amplifier 24 and the OSC transmitter 28 form together with a WDM coupler 30 the transmit arrangement 8. The OSC signal 42 and the data optical signal 40 are transmitted through the transmission fiber 20 and eventually reach a preamplifier 32 and a demultiplexer 26, at which the several channels are demultiplexed and directed to receivers 72.

Assuming a length of 300 km for the transmission fiber 20 and a typical attenuation value of 0.2 dB/km at a wavelength of 1550 nm, the total signal attenuation over the fiber span shown in the figure amounts to around 60 dB. In most cases, such attenuation is too high for the effective transmission of a data optical signal 40 without intermediate amplification. However, transmission becomes possible when using Raman amplification in the transmission fiber 20. For this purpose, a Raman pumping arrangement 1 is coupled to the other end of the transmission fiber 20. The Raman pumping arrangement 1 comprises a Raman pump 2 providing pumping power for counterdirectional Raman amplification to the data optical signal 40 and the OSC signal 42 being transmitted along the transmission fiber 20. In the embodiment shown in FIG. 1, the Raman pumping arrangement also comprises an OSC receiver 4 for receiving the OSC signal 42.

Figure 2A:
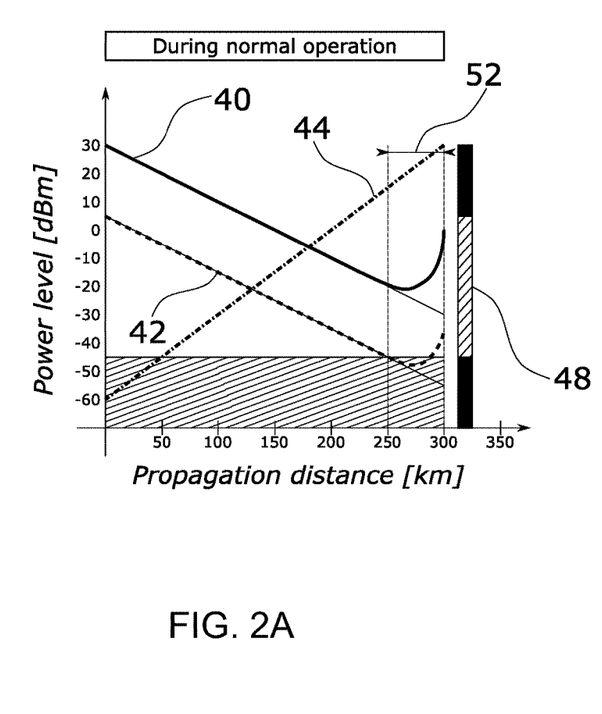
FIGS. 2A and 2B show the effects of attenuation on a data optical signal and an OSC signal transmitted in a fiber optic communication system in an operation mode and in a start-up mode.
Figure 2B:
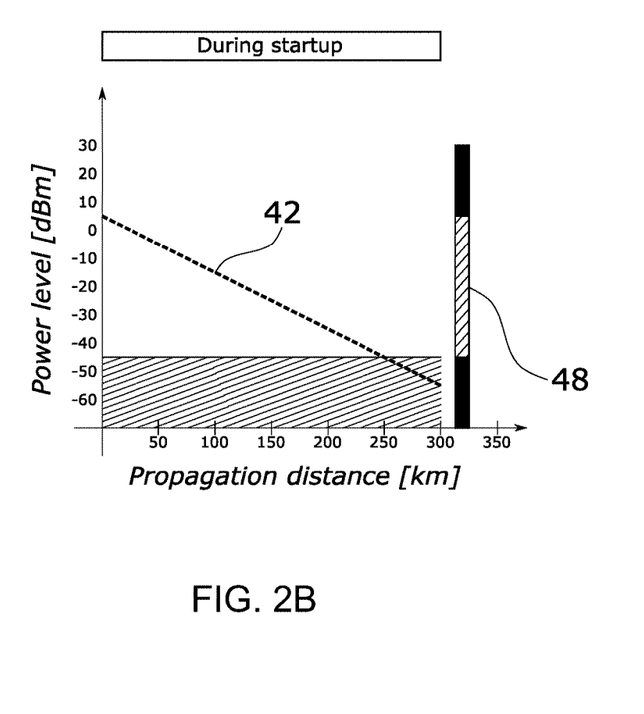

The effects of attenuation on a data optical signal 40 and an OSC signal 42 transmitted in the transmission fiber 20 are shown in FIG. 2. FIG. 2a illustrates the situation during normal operation, that is, when the Raman pumping arrangement 1 is working under normal conditions to provide Raman amplification of both signals in the transmission fiber 20 by means of the Raman pump signal 44. Due to attenuation, the power of the transmitted signals decreases exponentially with propagation distance from the launch power value, which is 30 dBm for the data optical signal 40 and 5 dBm for the OSC signal 42. When the effects of Raman amplification set in, the power of both signals increases again, thereby allowing the power of the OSC signal 42 to fall within the sensitivity window 48 of the OSC receiver 4, which is shown at the right margin of the figure In the embodiment shown, most of the Raman gain arises in a region 52 of the transmission fiber 20 close to the receivers 72, called main region of Raman gain in the following.

FIG. 2b illustrates a situation in which the Raman pumping arrangement 1 is deactivated such that no Raman amplification takes place in the transmission fiber 20. This might for example be due to the detection of a fiber breakage in the transmission fiber 20, for in this case laser safety measures prescribe the interruption of Raman amplification. Once the aforementioned fiber breakage has been repaired, the integrity of the transmission fiber 20 must be ensured by the reception of the OSC signal 42 before Raman amplification can be resumed. In this situation, the OSC signal 42 is hence not amplified by any Raman pump power produced by the Raman pumping arrangement 1 yet. Therefore, the power of the OSC signal 42 decreases exponentially over the entire length of the transmission fiber 20 from an initial launch power of 5 dBm to a final power of −55 dBm, which is below the sensibility window 48 of the OSC receiver 4 (see FIG. 2b). Thus, due to the lack of Raman amplification, the OSC receiver 4 is not able to detect the OSC signal 42. Consequently, the Raman pumping arrangement 1 is not able to ascertain that the transmission fiber 20 is again in a condition allowing for the Raman pump 2 to be activated.

Figure 3:
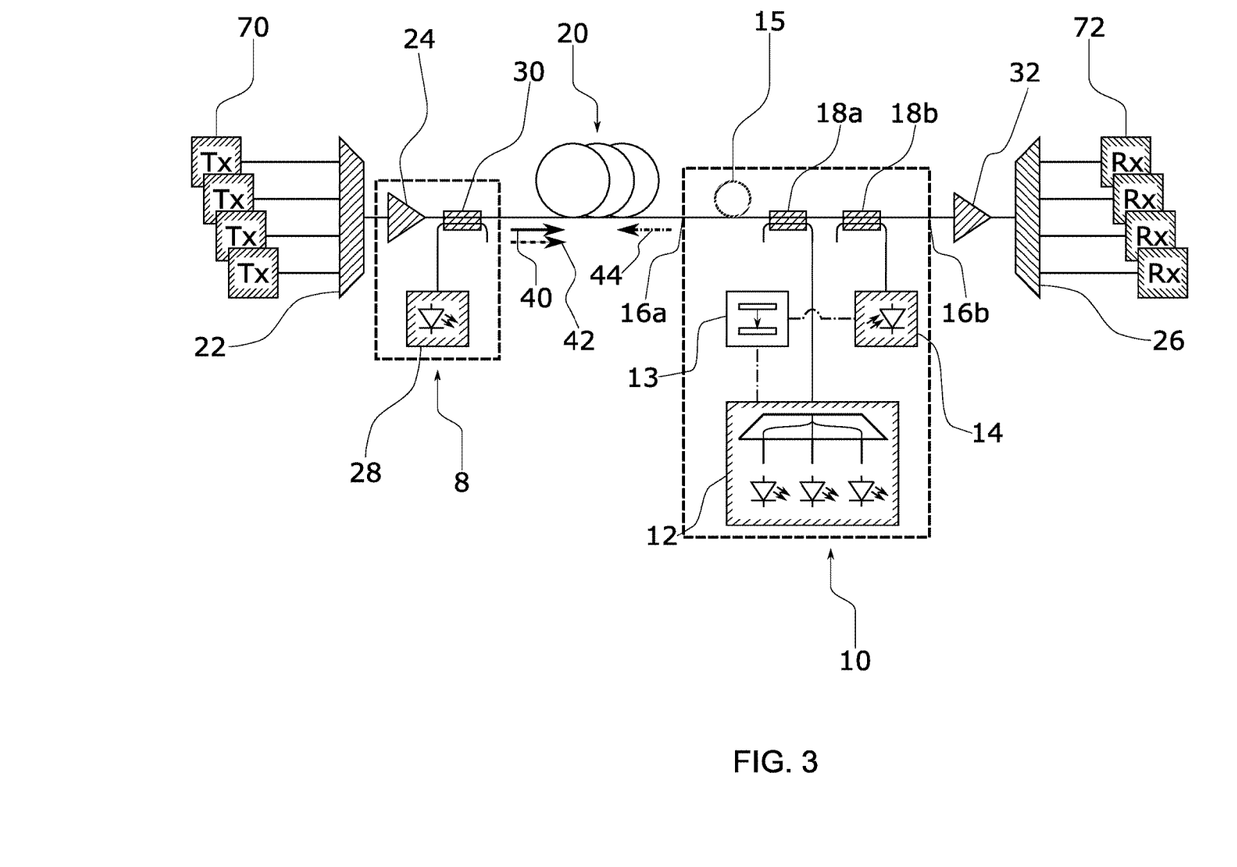
FIG. 3 shows a Raman pumping arrangement according to an embodiment of the invention.

FIG. 3 shows a Raman pumping arrangement 10 according to an embodiment of the invention allowing to overcome the elucidated problem. The Raman pumping arrangement 10 is incorporated in a fiber optic transmission system equivalent to that shown in FIG. 1. The Raman pumping arrangement 10 comprises a Raman pump 12, a control unit 13, an OSC receiver 14, and an amplification fiber 15. Further, the Raman pumping arrangement 10 comprises first and second ports 16a and 16b and first and second WDM couplers 18a and 18b. The first and second WDM couplers 18a and 18b are arranged to couple the pump signal of the Raman pump 12 into the transmission fiber 20 and to couple the OSC signal 42 out of the transmission fiber 20 to be fed to the OSC receiver 14, while passing the data optical signal 40. As before, the Raman pump 12 is configured for generating a Raman pump signal, wherein the Raman pump signal is used for amplifying data optical signals 40 transmitted through the transmission fiber 20 in the fiber optic transmission system shown. The OSC receiver is configured for receiving an OSC signal 42 transmitted through the transmission fiber 20 in the fiber optic transmission system shown copropagating with the data optical signal 40.

The data optical signal 40 and the OSC signal 42 are transmitted through the Raman pumping arrangement 10 between the first port 16a and the second port 16b. At the port 16b, the data signal is directed to further equipment such as a preamplifier 32, a demultiplexer 26, or subsequent receivers 72. The OSC signal 42 is internally directed to the OSC receiver 14. The Raman pump 12 is arranged to emit the Raman pump signal 44 through the first port 16a, and the amplification fiber 15 is provided between the Raman pump 12 and the first port 16a. This way, when the Raman pump 12 is in operation mode, both the data optical signal 40 and the OSC signal 42 are Raman amplified in the transmission fiber 20 counterdirectionally.

In the embodiment shown, the amplification fiber 15 is integrated within the Raman pumping arrangement 10, which may take the form of a Raman card that can be inserted in a corresponding rack. However, the amplification fiber 15 may also be arranged at some position along the transmission fiber 20 outside of a Raman card, be it right next to the Raman card—i.e. between the transmission fiber 20 and the Raman pump arrangement 1, and hence serving as a connection between the Raman card and the optical transmission fiber 20—or somewhere else along the optical transmission fiber. In such a case, the Raman card would typically contain all other components of the Raman pumping arrangement 10.

The amplification fiber 15, which, in the embodiment shown, is an erbium doped fiber (EDF), is arranged such that the data optical signal 40, the OSC signal 42, and the Raman pump signal 44 are transmitted therethrough. The control unit 13 is functionally connected to the Raman pump 12 and to the OSC receiver 14. The control unit 13 is configured for controlling the operation of the Raman pump 12.

The control unit 13 is configured for setting the Raman pump 12 in an operation mode, when the OSC receiver 14 receives the OSC signal 42, or in a start-up mode, when the OSC receiver 14 does not receive the OSC signal 42. In the operation mode, the Raman pump 12 provides an operation pumping power, and in the start-up mode, the Raman pump 12 provides a start-up pumping power. The start-up pumping power is substantially smaller than the operation pumping power. The start-up pumping power is suitable for pumping the amplification fiber 15, such that the OSC signal 42 is effectively amplified therein.

In the embodiment shown, the length of the amplification fiber 15 is chosen such that the amplification gain for the OSC signal 42 in the amplification fiber 15 allows the OSC receiver 14 to receive the OSC signal 42 even when the Raman pump 12 is in the start-up mode and hence operating at reduced power. In the embodiment shown, the amplification fiber 15 has a length of 8 m and a peak absorption around 1530 nm of 60 dB, which for a fiber optic communication system as the one described with reference to FIG.

1, allows providing an amplification gain for the OSC signal 42 in the amplification fiber 15 when the Raman pump 12 is in the start-up mode of at least 10 dB. The start-up pumping power provided by the Raman pump 12 is 100 mW, whereas the operation pumping power provided by the Raman pump 12 is 1 W or more.

Laser safety provisions (Hazard level 1M) allow launching up to 20.6 dBm (115 mW) at a wavelength of 1420 nm and slightly higher power levels at 1450 nm. Hence the Raman pump signal 44 provided by the Raman pump 12 with a pumping power of 100 mW does not contravene laser safety provisions even during the start-up phase, in which integrity of the fiber has not yet been fully ascertained and the Raman pump 12 may not operate with full pumping power, that is, in the operation mode. This start-up pumping power is sufficient to amplify the OSC signal 42 in the amplification fiber 15 such that the OSC signal 42 is detected at the OSC receiver 14, while the Raman pump 12 is in the start-up mode.

The control unit 13 is further configured for setting the Raman pump 12 in the start-up mode, when the OSC receiver 14 stops receiving the OSC signal 42, and for setting the Raman pump 12 in the operation mode, when the OSC receiver 14 starts receiving the OSC signal 42. Further, the control unit 13 is configured for setting the Raman pump 12 in an inspection mode when the OSC receiver 14 has not received the OSC signal 42 for more than a predefined waiting time and for intermittently activating and deactivating the Raman pump 12 setting it in the start-up mode in predefined scanning time intervals for a predefined inspection time. In the embodiment shown, the predefined waiting time amounts to 10 minutes, the predefined scanning time interval is 2 minutes and the predefined inspection time is 30 seconds.

The role of the booster amplifier 24 consists in generating sufficient launch power of the data optical signal 40 at the input of the transmission fiber. However, the shown amplifier can be replaced by any kind of optical amplifier that is suitable to generate sufficient optical signal power, be it a discrete amplifier or a distributed amplifier generating sufficient pump power in the part of the transmission fiber close to the transmit site in a distributed way. For example, a semiconductor optical amplifier (SOAs), an erbium-doped waveguide amplifier (EDWA), a discrete Raman amplifier, a codirectional (distributed) Raman amplifier, or a codirectional ROPAs might be used.

Figure 4A:
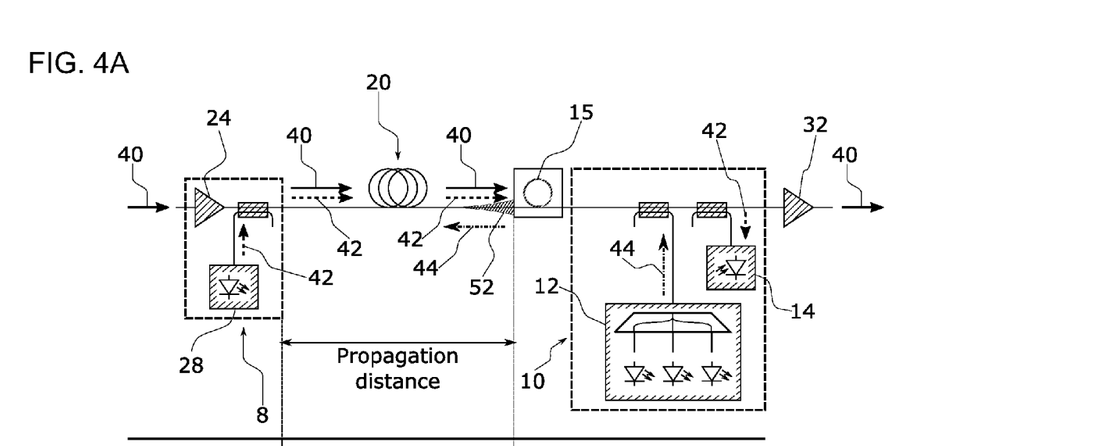
FIGS. 4A-4C show a Raman pumping arrangement according to an embodiment of the invention and the effects of attenuation, Raman amplification, and amplification in the amplification fiber.
Figure 4B:
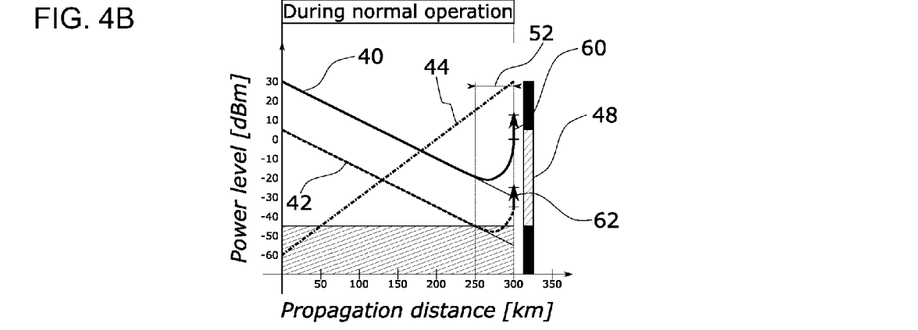
Figure 4C:
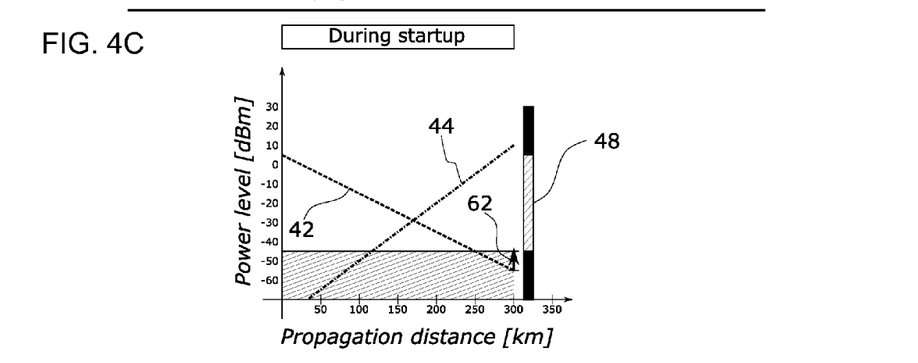

Plots analogous to those of FIG. 2 are shown in FIG. 4 for the embodiment of FIG. 3. The effects of attenuation, Raman gain, and gain in the amplification fiber 15 on a data optical signal 40 and an OSC signal 42 transmitted in the transmission fiber 20 are illustrated. FIG. 4a shows a part of the setup of FIG. 3 with the Raman pump signal 44 being transmitted through the amplification fiber 15 and providing at least 50% of the Raman gain to the optical signal and the OSC signal 42 in a portion of transmission fiber 20 located after the amplification fiber 15 with respect to the propagation of the Raman pump signal 44, called main region of Raman gain 52 in the following. FIG. 4b shows resulting power profiles for the data optical signal 40 and the OSC signal 42 under normal operation with a significant Raman gain in the main region of the Raman gain 52, i.e. in the example within the last 50 km of the transmission fiber 20. Furthermore, the increase of the power levels of both signals caused by the amplification fiber 15 is indicated by vertical arrows 60 and 62. The power profile for the OSC signal 42 in the start-up mode is illustrated in FIG. 4c. As seen in FIG. 4c, there is no noticeable Raman gain in the transmission fiber 20, but there is a gain of 10 dB in the amplification fiber 15 (see vertical arrow 62).

Figure 5:
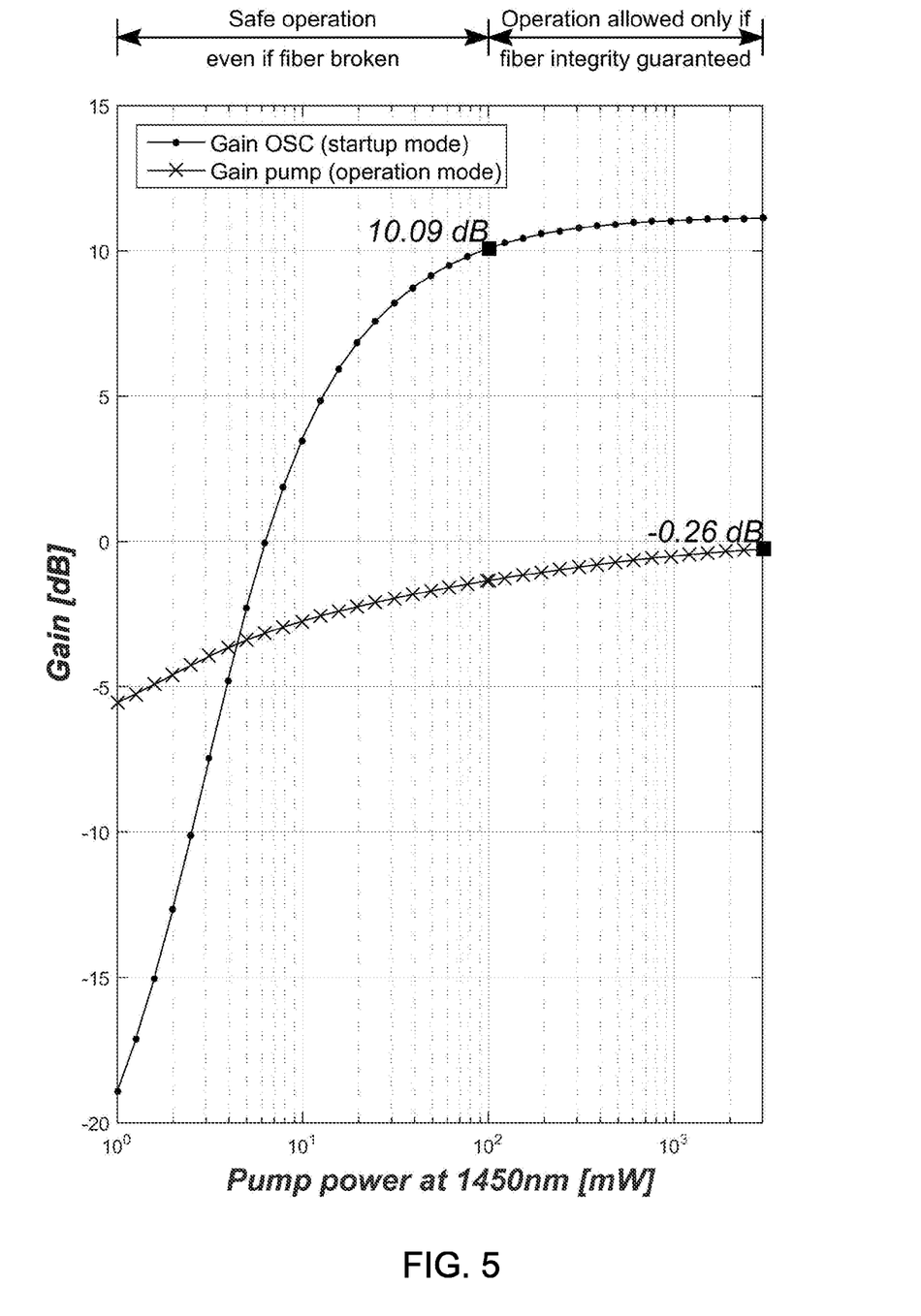
FIG. 5 is a plot of the gain in the amplification fiber of an embodiment of the invention as a function of pump power at 1450 nm.

FIG. 5 is a plot of the gain experienced in the amplification fiber 15 by the OSC signal 42 in the start-up mode and the gain experienced by the Raman pump signal in the operation mode versus the pumping power provided by the Raman pump 12. Negative gain values indicate attenuation. The considered range of Raman power levels is divided into two parts. In the first part on the left, laser safety provisions allow operation of the pump even if the fiber is broken. In the second part on the right, the pumps may be turned on only if fiber integrity has been confirmed. As seen in the figure, at a pumping power of 100 mW, which corresponds to the start-up pumping power of the embodiment considered in FIG. 3, the OSC signal 42 experiences a gain in the amplification fiber 15 of 10.09 dB in the start-up. Hence, the gain experienced by the OSC signal 42 in the amplification fiber 15 in the start-up mode is high enough to compensate part of the attenuation accumulated over the transmission fiber 20, such that the OSC signal 42 can be detected at the OSC receiver 14, fiber integrity can be confirmed and the system can turn to the operation mode. Further, the Raman pump signal 44 experiences a gain of −0.26 dB, that is, an attenuation of 0.26 dB in the operation mode. Hence the Raman pump signal 44 undergoes a minimum level of attenuation in the amplification fiber 15, which is marginal, such that the Raman pump signal 44 can provide sufficient Raman gain to the data optical signal 40 in the transmission fiber.

Figure 6A:
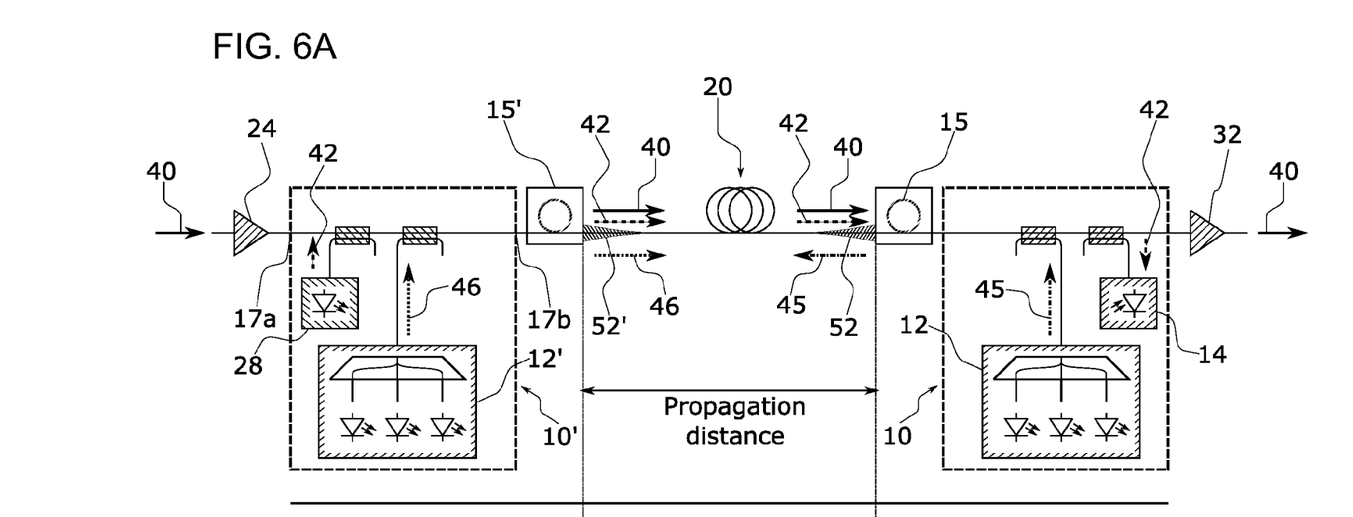
FIGS. 6A and 6B show a configuration of two Raman pumping arrangements according to two different embodiments of the invention combined to provide bidirectional Raman amplification.

In the embodiment shown, the amplification fibers 15 and 15' are placed outside of the housings comprising the remaining parts of the respective Raman pumping arrangements 10 and 10'. However, the amplification fibers 15 and 15' can likewise also be integrated into the housings of the Raman pumping arrangements 10 and 10'.

Figure 6B:
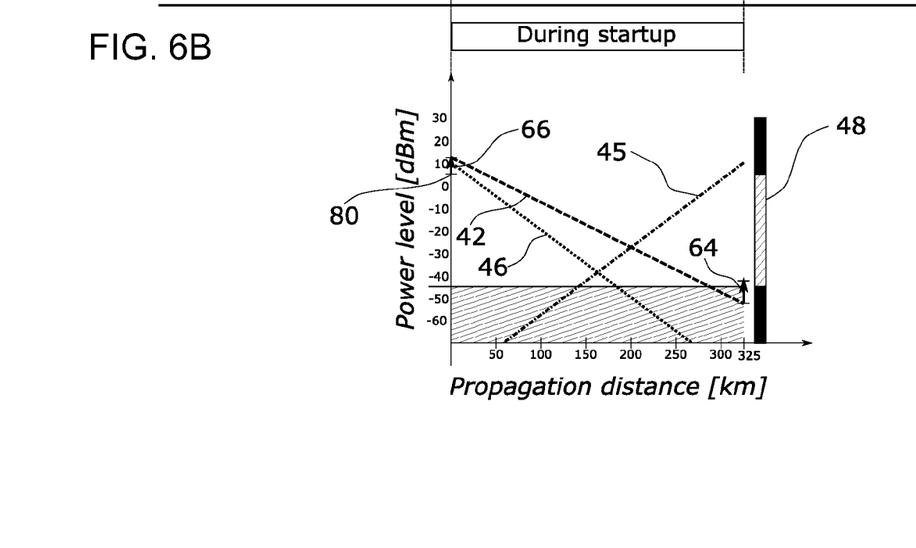

Different embodiments of the invention may be used in a combined way. For example, a combined use of some of the described embodiments of the invention allowing for bidirectional (codirectional and counterdirectional) Raman amplification is shown in FIG. 6. FIG. 6a shows the corresponding span setup. Starting from the setup in FIG. 3, the transmit arrangement 8 is replaced by a Raman pumping arrangement 10' comprising the OSC transmitter 28 and a pumping arrangement 12'. Before being launched into the input port 17a of the Raman pump arrangement 10', the data optical signal 40 to be transmitted is amplified by a booster amplifier 24 operated at smaller output power as compared with the setup of FIG. 3. Via a second additional amplification fiber 15' connected to the output 17b of the Raman pumping arrangement 10', the optical signal, the OSC signal 42, and a codirectional Raman pump signal 46 emitted by the pumping arrangement 12' are launched into the transmission fiber, where they propagate codirectionally. FIG. 6b shows the power profile of the OSC signal 42 along the transmission fiber 20 in the start-up mode. In addition to the gain generated in the amplification fiber 15, located close to the receiving site, the OSC signal 42 is also amplified (gain 66) in the second amplification fiber 15', located at the transmit site, and thus before being coupled into the transmission fiber 20. Similar to a counterdirectional Raman pump signal 44, the codirectional Raman pump signal 46 induces the major part of the SRS gain within the region of the transmission fiber that is close to the location where it is launched into the transmission fiber, i.e. in this case in a second main region of Raman gain 52'.

The use of a second amplification fiber 15' used in combination with a codirectional Raman pump is beneficial for example if the power 80 of the OSC signal 42 at the output port of the Raman pumping arrangement 10' is smaller than the power level at which nonlinear fiber effects, i.e. signal distortions induced by the OSC signal 42 on itself or on copropagating channels of the data optical signal 40, become noticeable. Furthermore, this solution is preferably used for small channel counts When using codirectional Raman amplification as illustrated in FIG. 6, the pump power level of the codirectional Raman pump 12' needs to be adjusted depending on the OSC signal 42 received at the other end of the transmission fiber 20, i.e. at the OSC receiver 14. Thus, information needs to be transmitted from the receiving side to the transmitting side.

Figure 7:
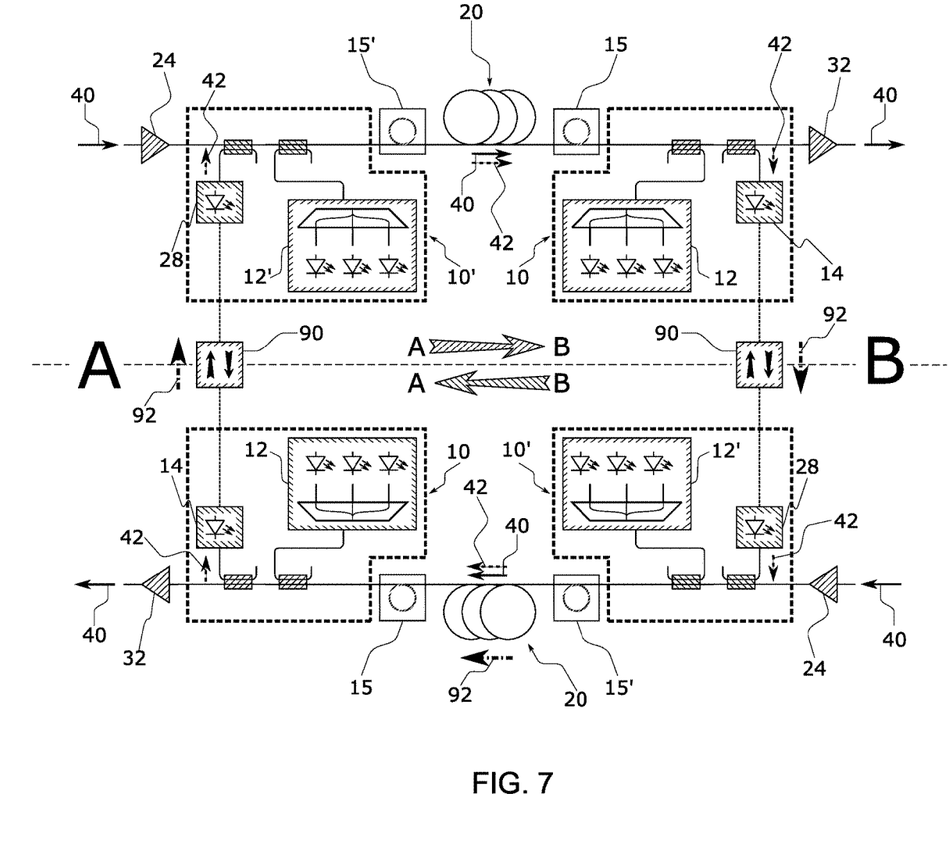
FIG. 7 shows four Raman pumping arrangements according to an embodiment of the invention used in two parallel transmission links.

FIG. 7 shows a configuration consisting of two parallel setups according to FIG. 6 transmitting data optical signals 40 in opposite directions. Equipment in the upper part of the figure is used for transmitting data from location A to location B, whereas the equipment in the lower part serves for data transmission from location B to location A. OSC signals 42 propagating codirectionally to the data optical signals 40 in both transmission fibers 20 allow to transmit control information between the two locations. Furthermore, there is at each location a communication element 90 providing a connection between the OSC receiver 14 and the OSC transmitter 28 for the opposite transmission direction. In the embodiment shown, this communication element 90 is a network control element, but it might also be a simple wired connection or a logical connection in a firmware, for example if the Raman pumping arrangements 10 and 10' are integrated in a single card.

The functionality of the setup will be described in the following for the transmission from location A to location B. but works in the same way for the transmission from location B to location A. When the OSC receiver 14 at location B used for controlling the transmission from location A to location B receives the OSC signal 42, corresponding control information 92 is transmitted from location B to location A by means of the OSC signal 42 shown in the lower part of the figure. Via the communication element 90 at location A, this information is next provided to the Raman pumping arrangement 10' at location A. Thus, the Raman pumping arrangement 10' at location A is able to set its Raman pump 12' into the operating mode or the start-up mode.

Figure 8A:
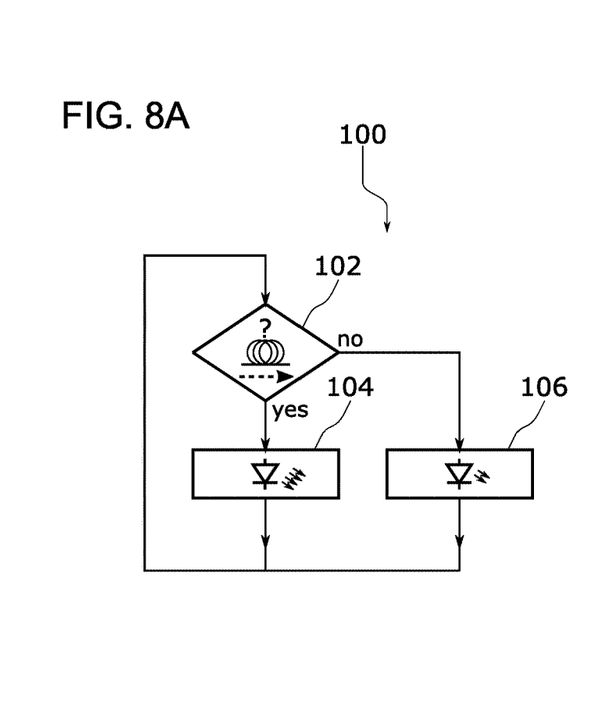
FIGS. 8A and 8B shows two possible implementations of the control algorithm executed by a control unit according to the invention.

Possible implementations of the control algorithm to be executed by the control unit 13 are shown in FIG. 8. FIG. 8*a* shows a basic control algorithm 100 supporting two control modes, namely the operation mode and the start-up mode. The control algorithm 100 comprises a check 102 whether the OSC signal 42 has been received by the OSC receiver 14. In case the OSC signal 42 has been received ("yes"), the Raman pump is set in step 104 to the operation mode. Otherwise ("no"), the Raman pump is set to the start-up mode in step 106. After performing one of the steps 104 or 106, the control algorithm 100 returns to the check 102.

Figure 8B:
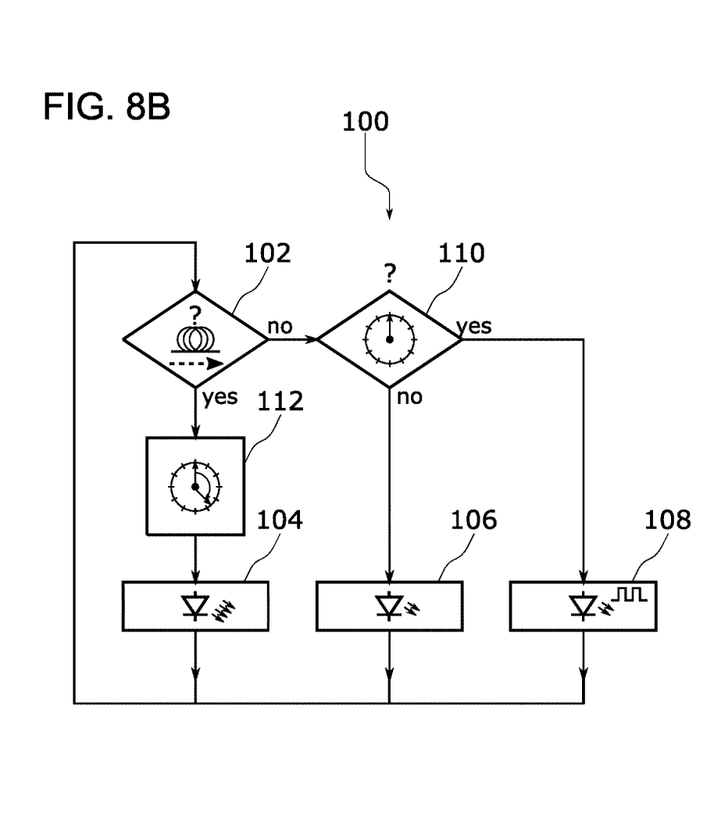

The control algorithm 100 shown in FIG. 8*b* is based on the control algorithm 100 of FIG. 8*a*, but comprises an additional mode of operation. As before, the Raman pump is set to the operation mode in step 104 once reception of the OSC signal 42 has been confirmed in check 102. In addition, a count down timer controlling the waiting time is set to the predefined waiting time in step 112. Another check 110 related to the count down timer is performed if check 102 revealed that the OSC signal 42 has not been received ("no"). If the count down timer has not yet returned to zero ("no"), the Raman pump is set to the start-up mode in step 106 and the algorithm 100 returns to the check 102. In case the timer has returned to zero ("yes"), step 108 setting the Raman pump to the inspection mode is executed and the control algorithm 110 return to check 102.

Figure 9:
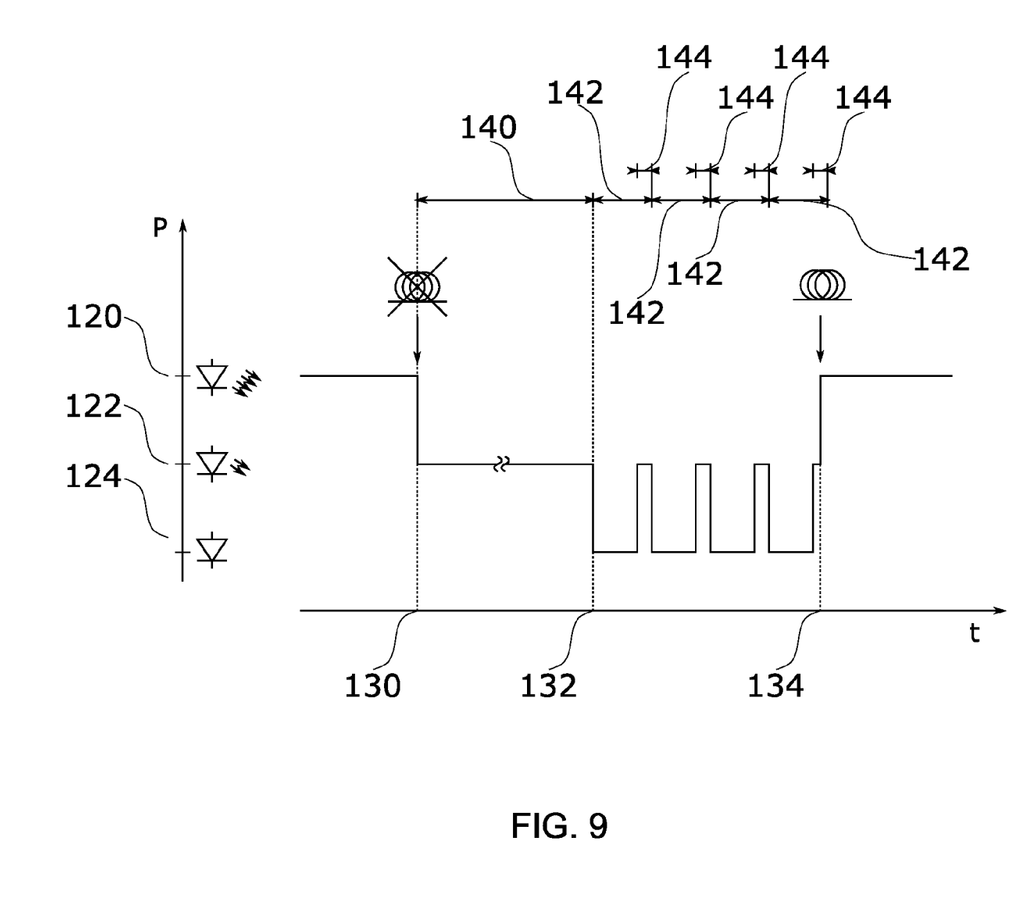
FIG. 9 illustrates the timing of the operation of a control unit according to the invention.

The timing diagram shown in FIG. 9 illustrates schematically the switching between the different modes of operation and the setting of the Raman pump power P versus time t. At the beginning, the transmission fiber is intact, the Raman pumping arrangement 10 is operated in the operation mode, and the Raman pump power is set to the operation pumping power 120. Upon detection of a fiber break at time 130 and interruption of the transmission of the OSC signal 42, the control unit 13 causes the Raman pump 12 to switch to the start-up mode and the Raman pump power P is set to the start-up pumping power 122. Since the OSC signal 42 has not been received within the predefined waiting time 140, the inspection mode is activated at time 132. The Raman pump is now deactivated, i.e. set to the zero pumping power 124, and intermittently activated and set in the start-up mode in predefined scanning time intervals 142 for a predefined inspection time 144. Zero pumping power 124 stands for a Raman pump power level smaller than the start-up pumping power 122, preferably close to zero or even zero. During the inspection time, the Raman pump power is set to the start-up pumping power 122. In the example, the OSC signal 42 is received during the fourth scanning time interval 142 at time 134. Consequently, the Raman pumping arrangement 10 returns to the operation mode and the Raman pump power is set to the operation pumping power 120.

Although preferred exemplary embodiments are shown and specified in detail in the drawings and the preceding specification, these should be viewed as purely exemplary and not as limiting the invention. It is noted in this regard that only the preferred exemplary embodiments are shown and specified, and all variations and modifications should be protected that presently or in the future lie within the scope of protection of the invention as defined in the claims.

What is claimed as new and desired to be protected by Letters Patent of the United States is:

1. A Raman pumping arrangement for amplifying a data optical signal transmitted in a fiber optic transmission system comprising:
   a Raman pump for generating a Raman pump signal wherein the Raman pump signal is used for amplifying the data optical signal in the fiber optic transmission system;
   an optical supervisory channel receiver for receiving an optical supervisory channel signal transmitted through the fiber optic transmission system and copropagating with the data optical signal;
   an amplification fiber arranged such that the data optical signal, the optical supervisory channel signal, and the Raman pump signal are transmitted therethrough; and
   a control unit functionally connected to the Raman pump and to the optical supervisory channel receiver, the control unit being configured for controlling the operation of the Raman pump;
   wherein the control unit is configured for setting the Raman pump in
   an operation mode, when the optical supervisory channel receiver receives the optical supervisory channel signal; or
   a start-up mode, when the optical supervisory channel receiver does not receive the optical supervisory channel signal;

wherein in the operation mode, the Raman pump provides an operation pumping power, and wherein in the start-up mode, the Raman pump provides a start-up pumping power, the start-up pumping power being smaller than the operation pumping power, said start-up pumping power being suitable for pumping the amplification fiber.

2. The Raman pumping arrangement of claim 1, wherein the operation pumping power is between 500 and 4000 mW, and wherein the start-up pumping power is between 50 and 130 mW.

3. The Raman pumping arrangement of claim 1, wherein one or more of length, doping, and material composition of the amplification fiber is chosen such that an amplification gain for the optical supervisory channel signal in the amplification fiber allows the optical supervisory channel receiver to receive the optical supervisory channel signal when the Raman pump is in the start-up mode.

4. The Raman pumping arrangement of claim 1, wherein one or more of length, doping, and material composition of the amplification fiber is chosen such that an amplification gain for the optical supervisory channel signal in the amplification fiber when the Raman pump is in the start-up mode is at least 5 dB; and/or
wherein one or more of the length, doping, and material composition of the amplification fiber is chosen such that an attenuation of the Raman pump signal in the amplification fiber when the Raman pump is in the operation mode is smaller than 1 dB.

5. The Raman pumping arrangement of claim 1, wherein the amplification fiber is a rare earth doped fiber; and/or
wherein the amplification fiber has a length between 3 m and 15 m; and/or
wherein the total peak absorption of the amplification fiber is between 18 dB and 90 dB.

6. The Raman pumping arrangement of claim 1, wherein the control unit is configured for:
setting the Raman pump in the start-up mode when the optical supervisory channel receiver stops receiving the optical supervisory channel signal; and
setting the Raman pump in the operation mode, when the optical supervisory channel receiver starts receiving the optical supervisory channel signal.

7. The Raman pumping arrangement of claim 1, wherein the control unit is further configured for:
setting the Raman pump in an inspection mode when the optical supervisory channel receiver has not received the optical supervisory channel signal for more than a predefined waiting time, wherein in the inspection mode, the Raman pump is deactivated and intermittently activated and set in the start-up mode in predefined scanning time intervals for a predefined inspection time.

8. The Raman pumping arrangement of claim 1, wherein the Raman pumping arrangement has a first and a second port, wherein the data optical signal and the optical supervisory channel signal can be transmitted through the Raman pumping arrangement from the first port towards the second port, wherein the Raman pump is arranged to emit the Raman pump signal through the first port; or
wherein Raman pumping arrangement has a first and a second port, wherein the data optical signal and the optical supervisory channel signal can be transmitted through the Raman pumping arrangement from the first port towards the second port, wherein the Raman pump is arranged to emit the Raman pump signal through the second port; or
wherein Raman pumping arrangement has a first and a second port, wherein the data optical signal and the optical supervisory channel signal can be transmitted through the Raman pumping arrangement between the first and the second port, wherein the Raman pump is arranged to emit a part of the Raman pump signal through the first port and another part of the Raman pump signal through the second port.

9. The Raman pumping arrangement of claim 1 further configured such that, in the operation mode, the Raman pump signal provides at least 50% of the total Raman amplification gain caused to the data optical signal in a portion of the fiber optic transmission system located after the amplification fiber with respect to the propagation of the Raman pump signal.

10. A method of amplifying a data optical signal transmitted in a fiber optic transmission system by Raman amplification using a Raman pumping arrangement, the Raman pumping arrangement comprising:
a Raman pump for generating a Raman pump signal, wherein the Raman pump signal is used for amplifying the data optical signal in the fiber optic transmission system;
an optical supervisory channel receiver for receiving an optical supervisory channel signal transmitted through the fiber optic transmission system, wherein the optical supervisory channel signal copropagates with the data optical signal;
wherein the method comprises a step of determining whether the optical supervisory channel signal is being received at the optical supervisory channel receiver and;
setting the Raman pump in an operation mode if the optical supervisory channel receiver receives the optical supervisory channel signal; or
setting the Raman pump in a start-up mode, if the optical supervisory channel receiver does not receive the optical supervisory channel signal;
wherein in the operation mode, the Raman pump provides an operation pumping power, and wherein in the start-up mode, the Raman pump provides a start-up pumping power, the start-up pumping power being smaller than the operation pumping power, said start-up pumping power being suitable for pumping the amplification fiber;
wherein the method further comprises a step of amplifying the optical supervisory channel signal in an amplification fiber using the Raman pump signal in the start-up mode for pumping the amplification fiber.

11. The method of claim 10, wherein the step of setting the Raman pump in the operation mode comprises setting the Raman pump to provide a pumping power between 500 mW and 4000 mW and wherein the step of setting the Raman pump in the start-up mode comprises setting the Raman pump to provide a pumping power between 50 mW and 130 mW.

12. The method of claim 10, wherein the method further comprises a step of setting the gain for the pumping power provided by the Raman pump such that amplification gain of the optical supervisory channel signal in the amplification fiber when the Raman pump is in the start-up mode is at least 5 dB.

13. The method of claim 10, wherein the method further comprises a step of setting the Raman pump in the start-up mode when the optical supervisory channel receiver does not receive or stops receiving the optical supervisory channel signal; and setting the Raman pump in the operation mode, when the optical supervisory channel starts receiving the optical supervisory channel signal.

14. The method of claim 10, wherein the method further comprises a step of setting the Raman pump in an inspection mode when the optical supervisory channel receiver has not received the optical supervisory channel signal for more than a predefined waiting time, wherein in the inspection mode, the Raman pump is deactivated and intermittently activated and set in the start-up mode in predefined scanning time intervals for a predefined inspection time.

15. The method of claim 10, wherein the step of amplifying the optical supervisory channel signal in the amplification fiber comprises amplifying the OSC signal such that, in the operation mode, at least 50% of the total Raman amplification gain provided to the data optical signal is provided in a portion of the fiber optic transmission system located after the amplification fiber with respect to the propagation of the Raman pump signal.

\* \* \* \* \*